United States Patent Office 3,647,750
Patented Mar. 7, 1972

3,647,750
PREPARATION OF HYDROXYALKYL ESTERS OF AROMATIC ACIDS
Marvin A. McCall, Kingsport, Tenn., assignor to Eastman Kodak Company, Rochester, N.Y.
No Drawing. Filed Oct. 13, 1969, Ser. No. 866,039
Int. Cl. C07c 69/78, 69/82
U.S. Cl. 260—475 P
17 Claims

ABSTRACT OF THE DISCLOSURE

In the preparation of 2-hydroxyalkyl esters of aromatic mono- or dicarboxylic acids by reaction of aromatic mono- or dicarboxylic acid with an alkylene oxide of 2 to 8 carbon atoms, the improvement which comprises conducting the reaction in hexamethylphosphoric triamide as a reaction medium.

---

This invention relates to a process for the preparation of hydroxyalkyl esters of aromatic mono- and dicarboxylic acids and is particularly directed to the process for the preparation of 2-hydroxyethyl hydrogen terephthalate and bis-(2-hydroxyethyl) terephthalate. These compounds are valuable intermediates for the preparation of high molecular weight linear polyesters (i.e., poly(ethylene terephthalate)). More specifically, this invention is concerned with the preparation of bis(2-hydroxyethyl) terephthalate from crude terephthalic acid (TPA) and ethylene oxide employing hexamethylphosphoric triamide (HPT) as a reaction medium.

A review of the prior art reveals that in the past various attempts have been made to effect a direct reaction of ethylene glycol with aromatic dicarboxylic acids to produce directly a bis(glycol) dicarboxylate that can be condensed further to high molecular weight polyesters. Such processes have been difficult because of the extremely low solubility of the terephthalic acid in the glycol and the extremely low rate of esterification that can be obtained even in the presence of a large excess of glycol reactant. Furthermore, the glycol reactant invariably undergoes some self-condensation during the direct esterification reaction resulting in the formation of ether-glycols which affect the final polyester.

Generally, the linear polyesters such as poly(ethylene terephthalate) are prepared by an ester interchange reaction. However, the ester interchange process has the disadvantage that the aromatic dicarboxylic acid must first be converted to a dialkyl ester, which in practice, is usually the dimethyl ester. This dimethyl ester is then subjected to an ester interchange reaction with a large excess of glycol to form the intermediate bis(2-hydroxyethyl) terephthalate which is then polymerized to the high molecular weight poly(ethylene terephthalate). The large excess of ethylene glycol as well as the alcohol (methanol) from the ester interchange reaction must be recovered by distillation and recycled. This reaction sequence has been necessary in the past because the manufacture of terephthalic acid (TPA) of sufficiently high purity to be used directly in making 2-hydroxyethyl terephthalate is extremely difficult and until recently was not economically feasible. It is for this reason that dimethyl terephthalate has been, for the most part, the sole starting material used in the production of poly(ethylene terephthalate).

Numerous processes have also been proposed whereby ethylene oxide is reacted with various aromatic dicarboxylic acids. The main difference in these processes of the prior art is the solvent employed and such solvents as dimethyl formamide, water, water and sodium hydroxide, water and trialkyl amines, water and ammonium hydroxide, $C_4$–$C_6$ ketones, alcohols, triethylamines, and halogenated hydrocarbons, etc. have been employed. Unfortunately, these prior art processes have not been entirely satisfactory in that the yield of product obtained often leaves much to be desired. Also crude terephthalic acid, that is, contaminated with catalyst residues such as cobalt impurities, cannot be used if a high purity product is desired.

One of the objects of this invention, therefore, is to provide a process for the preparation of 2-hydroxyalkyl esters of aromatic acids directly from the crude acid and alkylene oxide. A more specific object is to provide a process for the preparation of bis(2-hydroxyethyl) terephthalate directly from crude terephthalic acid and ethylene oxide.

Another object of the invention is to provide a process leading to poly(ethylene terephthalate) that uses ethylene oxide rather than the more expensive ethylene glycol.

Yet, another object is to provide a process which bypasses the manufacture of dimethyl terephthalate.

A further object is to provide a lower energy process than that generally used. For example, the present manufacturing process of the prior art requires a high energy input which is expensive and time consuming whereas the process of the invention has the advantage of being a comparatively low energy process requiring mild conditions and short reaction time with inexpensive equipment.

These and other objects of the invention which will be obvious to those skilled in the art are obtained by reacting an aromatic mono- or dicarboxylic acid and an alkylene oxide using hexamethylphosphoric triamide (HPT) as a reaction medium. The virtues of the process of the invention are tied up primarily with use of the HPT as the solvent or dispersant for the aromatic mono- and dicarboxylic acids.

One of the important advantages offered by the process of the invention is that crude grade aromatic acids such as crude terephthalic acids can be used in the process. Use of the HPT in accordance with the process of the invention virtually removes all of the cobalt and other catalyst residues found in crude aromatic mono- and dicarboxylic acids, particularly terephthalic acid. The exact mechanism by which the HPT accomplishes this result is not known for certain but probably results from the strong solvent and complexing action of the HPT. This same complexing action may also account for the observed mild reaction conditions needed when HPT is used as the reaction medium. The reaction temperature employed will generally fall within the range of about 90° to 180° C. Use of temperatures higher than about 180° C. should be avoided since the HPT reacts with aromatic acids at these elevated temperatures forming dimethyl amides and phosphoric acids (Chem. and Ind., Sept. 3, 1966, p. 1529). Temperatures below about 90° C. effect undesirably low reaction rates and conversions. The preferred reaction temperature of the process of the invention is usually about 100° to 125° C.

The reaction time may vary with the temperature chosen but generally the reaction time needed to complete the reaction is short, from about 5 to 25 minutes; however, longer contact times of 1 to 2 hours may be used without any obvious detriment to the product.

The aromatic acid reactant of the invention will dissolve in HPT if it is heated with enough HPT and this solution may be used in the process; however, a solution of HPT is not necessary and, in fact, it is preferred to use a slurry of finely divided aromatic acid reactant. This slurry should be stirred to prevent caking or formation of lumps which might prevent efficient contact with the alkylene oxide. The amount of HPT may be varied over a wide range but generally should be enough to make a fluid suspension so that it could be pumped or poured. Preferably, the amount of HPT should be about 4 to 1 of HPT to aromatic acid on a weight basis; however, other ratios may be used.

The amount of alkylene oxide used will depend upon whether the monohydroxyalkyl ester or the bis(2-hydroxyalkyl) ester is desired. If the former is sought, a 1 to 1 mole ratio of alkylene oxide and aromatic acid such as terephthalic acid is generally used. However, an excess of alkylene oxide may be desirable even when preparing the monoester. The most desirable amount of alkylene oxide can be determined simply by a few experiments with the particular system being used. In the preparation of the diester or biester, a mole ratio of alkylene oxide to aromatic dicarboxylic acid employed is at least 2 to 1. It is advantageous to use about 50% excess alkylene oxide in the preparation of the diester. A 50% excess of alkylene oxide based on the stiochiometric amounts is usually sufficient to effect a 100% conversion to diester under a reasonable time (approximately 15 minutes) and temperature conditions (approximately 110° C.); however, a larger excess may be used, if desired.

While the process conditions can be adjusted to give 100% conversion to the diester, the monoester is usually obtained as a mixture with some unreacted aromatic dicarboxylic acid and some diester. The aromatic dicarboxylic acid and diester can be separated by fractional crystallization usually from water. The relative amounts of the three products, the aromatic dicarboxylic acid, monoester, and diesters, can be varied by changing the amounts of ethylene oxide used and can be modified somewhat by the amount of HPT used in the process.

This invention has been directed primarily to the preparation of 2-hydroxyethyl hydrogen terephthalate and bis-(2-hydroxyethyl) terephthalate by the reaction of ethylene oxide and terephthalic acid and the preparation of the latter diester constitutes a preferred embodiments of this invention. The invention, however, is applicable in general to other monomeric glycol dicarboxylates wherein other alkylene oxides are employed as reactants and other aromatic acids and diacids, i.e., benzoic, substituted benzoic, isophthalic and phthalic acids or mixtures of these acids may be used as reactants.

The akylene oxides may have from 2 to 8 carbon atoms in the molecule. Specific oxides, for example, include ethylene oxide, propylene oxide, butylene oxide, isobutylene oxide, 1,2-epoxypentane and the like. The alkylene oxide may have an aromatic substituent, for example, styrene oxide. Other substituents inert to reaction in the system may be present such as halogen groups, for example, epichlorohydrin, epibromohydrin and the like.

The process of the invention may be run as a batch or a continuous process. For example, the process of the invention may be employed as a continuous manufacturing process by simply pumping an aromatic dicarboxylic acid such as terephthalic acid slurry in HPT with ethylene oxide through a pipe heated to 100–115° C. with a contact time of 15 minutes or less to obtain 100% conversion, isolating the resulting product from HPT by drowning in water and then recovering the HPT by distillation. Rates in conversion of this scope have not heretofore been obtainable by prior art processes.

The following examples are included to further illustrate the present invention but should not be construed as limiting the invention in any respect.

EXAMPLE 1

Bis(2-hydroxyethyl) terephthalate

A mixture of 41.5 g. (0.25 mole) of crude terephthalic acid (containing 257 p.p.m. cobalt impurity), 175 ml. of hexamethylphosphoric triamide (HPT) and 37.2 ml. (0.5 mole plus 50% excess) of ethylene oxide is charged into a stainless steel autoclave and then heated at 110° C. for 15 minutes. The resulting reaction solution is found by NMR analysis to contain bis(2-hydroxyethyl)terephthalate as the sole product with no unreacted TPA or monoester, 2-hydroxyethyl terephthalate, present. This solution of product in HPT is poured into 500 ml. of ice water. The solid product slowly precipitated and after about 15 minutes, is filtered and washed with several portions of cold water. There is obtained 45.6 g. (72%) of bis(2-hydroxyethyl) terephthalate, M.P. 105° to 107° C. This product on recrystallization from water has an M.P. of 109° to 110° C. Carbon and hydrogen analyses are correct for bis(2-hydroxyethyl)terephthalate. More product may be obtained from the first filtrate by removing the water and then the HPT under vacuum. The residue contains mostly product which may be recovered and recrystallized from water. An alternate procedure is to remove the water from the HPT filtrate and using this filtrate which contains HPT and some dissolved bis(2-hydroxyethyl) terephthalate in the next reaction.

The product of this reaction is found to contain no cobalt impurity and to form poly(ethylene terephthalate) by heating with known ester interchange catalysts under reduced pressure removing the ethylene glycol. The inherent viscosity of this polymer is 0.61.

EXAMPLE 2

Bis(hydroxypropyl) terephthalate

A mixture of 41.5 g. (0.25 mole) of crude terephthalic acid, 175 ml. of hexamethyl phosphoric triamide (HPT) and 43.5 g. of 1,2-propylene oxide (0.5 mole plus 50% excess) is charged into a stainless steel autoclave and heated at 115° C. for 20 minutes. The product is isolated in the same manner as described in Example 1 in good yield. The product melts at 130° to 131° C.

EXAMPLE 3

Bis(hydroxypentyl) terephthalate

A mixture of crude terephthalic acid (0.25 mole), 175 ml. of hexamethylphosphoric triamide (HPT) and 64.6 g. of 1,2-epoxypentane are heated at 120° C. for 30 minutes. The product, bis(hydroxypentyl) terephthalate, is obtained in good yield.

EXAMPLE 4

Bis(2-hydroxyethyl) isophthalate

The procedure of Example 1 is repeated except that 41.5 g. (0.25 mole) of isophthalic acid is used instead of the terephthalic acid of Example 1. The product, bis(2-hydroxyethyl) isophthalate, is isolated in good yield.

EXAMPLE 5

Bis(2-hydroxyethyl) phthalate

The procedure of Example 1 is repeated except that 41.5 g. (0.25 mole) of phthalic acid is used instead of the terephthalic acid of Example 1. The product, bis(2-hydroxyethyl) phthalate, is isolated in good yield.

EXAMPLE 6

Mixture of bis(2-hydroxyethyl) terephthalate and isophthalate

In a simliar manner, a 50/50 mixture of terephthalic and isophthalic acids are dispersed in HPT and reacted with ethylene oxide under the same conditions as used in Example 1. The product is a mixture of bis(2-hydroxyethyl) terephthalate and isophthalate.

In a similar manner, other mixtures in which the ratio of terephthalic and isophthalic acids are varied over wide ranges give mixtures of the bis(2-hydroxyethyl) esters of the mixed diacids. Mixtures of acids containing from 0.1 to 10 parts by weight of terephthalic per part of isophthalic with suitable amounts of ethylene oxide in HPT at temperatures of 95° to 175° C. in reaction times from 10 minutes to 1 hour give useful bis(2-hydroxyethyl) esters of the diacid mixtures.

EXAMPLE 7

2-hydroxyethyl hydrogen terephthalate

A mixture of 166.1 g. (1 mole) of terephthalic acid (plant grade), 700 ml. of HPT and 52 ml. ethylene oxide (2 moles) is charged into a stainless steel autoclave and then heated at 110° C. for 15 minutes. The resulting solution contained 19% of unreacted terephthalic acid, 38% bis(2-hydroxyethyl) terephthalate, and 43% of 2-hydroxyethyl hydrogen terephthalate as shown by NMR spectrum. This reaction mixture is poured into ice cold water and the solid which first precipitated is mostly unreacted TPA which is removed by filtration. The filtrate is then cooled to 0° to 5° C. and again filtered to give crude 2-hydroxyethyl terephthalate. This monoester is recrystallized from ethyl acetate to give a material melting at 182° to 183° C. Carbon and hydrogen analysis is correct for $C_{10}H_{10}O_5$ or the 2-hydroxyethyl hydrogen terephthalate.

EXAMPLE 8

2-hydroxyethyl benzoate

The procedure of Example 1 is repeated except that 30.5 g. (0.25 mole) of benzoic acid is used instead of terephthalic acid. The amount of ethylene oxide used is 22.0 g. (0.5 mole). The 2-hydroxyethyl benzoate is obtained in good yield.

The invention has been described in considerable detail with particular reference to certain preferred embodiments thereof, but it will be understood that variations and modifications can be effected within the spirit and scope of the invention.

I claim:

1. In the preparation of 2-hydroxyalkyl esters of aromatic mono- or dicarboxylic acids by reaction of benzene mono- or dicarboxylic acid with an alkylene oxide of 2 to 8 carbon atoms, the improvement which comprises conducting the reaction in hexamethylphosphoric triamide as a reaction medium.

2. The process of claim 1 wherein the reaction is conducted at a temperature of about 90° to 180° C.

3. The process of claim 1 wherein the acid is a benzene dicarboxylic acid.

4. The process of claim 3 wherein the benzene dicarboxylic acid is terephthalic acid and the alkylene oxide is ethylene oxide.

5. The process of claim 3 wherein the benzene dicarboxylic acid is terephthalic acid and the alkylene oxide is 1,2-propylene oxide.

6. The process of claim 3 wherein the benzene dicarboxylic acid is terephthalic acid and the alkylene oxide is 1,2-epoxypentane oxide.

7. The process of claim 3 wherein the benzene dicarboxylic acid is isophthalic acid and the alkylene oxide is ethylene oxide.

8. The process of claim 3 wherein the benzene dicarboxylic acid is phthalic acid and the alkylene oxide is ethylene oxide.

9. The process of claim 3 wherein the benzene dicarboxylic acid is a mixture of isophthalic and terephthalic acids.

10. The process of claim 3 wherein the benzene dicarboxylic acid is reacted as a slurry in said hexamethylphosphoric triamide.

11. The process of claim 3 wherein the benzene dicarboxylic acid is dissolved in said hexamethylphosphoric triamide.

12. The process of claim 4 wherein the terephthalic acid is crude terephthalic acid containing cobalt catalyst residue impurity.

13. In the preparation of bis(2-hydroxyalkyl) esters of aromatic dicarboxylic acid by reaction of a benzene dicarboxylic acid and alkylene oxide containing 2 to 8 carbon atoms, the improvement which comprises conducting the reaction in hexamethylphosphoric triamide as a reaction medium.

14. The process of claim 13 wherein the reaction is conducted at a temperature of about 90° to 180° C.

15. The process of claim 13 wherein the benzene dicarboxylic acid is reacted as a slurry in said hexamethylphosphoric triamide.

16. The process of claim 13 wherein the benzene dicarboxylic acid is dissolved in said hexamethylphosphoric triamide.

17. In the preparation of bis(2-hydroxyethyl) terephthalic by the reaction of terephthalic acid and ethylene oxide, the improvement which comprises conducting the reaction in hexamethylphosphoric triamide as a reaction medium.

References Cited
UNITED STATES PATENTS 3,459,788   8/1969   Enoki et al. _____ 260—475 P JAMES A. PATTEN, Primary Examiner E. J. SKELLY, Assistant Examiner U.S. Cl. X.R.

260—476 R